United States Patent
Lewis et al.

(10) Patent No.: US 9,876,748 B1
(45) Date of Patent: Jan. 23, 2018

(54) NOTIFYING USERS IN RESPONSE TO MOVEMENT OF A CONTENT ITEM TO A NEW CONTENT SOURCE

(71) Applicant: Google Inc., Mountain View, CA (US)

(72) Inventors: Justin Lewis, Marina del Rey, CA (US); Michael Patrick Schneider, Venice, CA (US)

(73) Assignee: Google LLC, Mountain View, CA (US)

(*) Notice: Subject to any disclaimer, the term of this patent is extended or adjusted under 35 U.S.C. 154(b) by 195 days.

(21) Appl. No.: 14/084,214

(22) Filed: Nov. 19, 2013

(51) Int. Cl.
*H04L 12/58* (2006.01)

(52) U.S. Cl.
CPC .............. *H04L 51/24* (2013.01); *H04L 51/04* (2013.01)

(58) Field of Classification Search
CPC .............................. H04L 51/04; H04L 51/043
See application file for complete search history.

(56) References Cited

U.S. PATENT DOCUMENTS

| | | | | |
|---|---|---|---|---|
| 4,933,967 A * | 6/1990 | Lo | ..................... | H04M 3/533 379/245 |
| 7,620,996 B2 * | 11/2009 | Torres | ................. | G06F 17/3089 726/28 |
| 8,037,093 B2 * | 10/2011 | Tiu, Jr. | .............. | G06F 17/30867 707/713 |
| 8,060,634 B1 * | 11/2011 | Darnell | ............... | H04L 67/1095 709/218 |
| 8,090,776 B2 * | 1/2012 | Torres | ................. | G06F 17/3089 709/204 |
| 8,554,837 B2 * | 10/2013 | Davi | .................... | G06F 17/3089 709/204 |
| 8,612,527 B2 * | 12/2013 | Sharp | .................... | H04L 12/587 709/206 |
| 8,782,145 B2 * | 7/2014 | Cherukuri | ........... | H04L 12/1813 709/204 |
| 9,256,341 B2 * | 2/2016 | Megiddo | ................. | G06F 3/048 |
| 9,348,822 B2 * | 5/2016 | Maskatia | .......... | G06F 17/30029 |
| 2002/0059181 A1 * | 5/2002 | Kohda | .............. | G06F 17/30873 |
| 2005/0174869 A1 * | 8/2005 | Kottomtharayil | .... | G11B 17/228 365/222 |
| 2006/0115241 A1 * | 6/2006 | Saigo | ............... | G11B 20/00086 386/239 |
| 2006/0288115 A1 * | 12/2006 | Neuman | ........... | H04L 29/12594 709/232 |
| 2007/0083894 A1 * | 4/2007 | Gonsalves | .......... | G06F 17/3089 725/46 |
| 2007/0174324 A1 * | 7/2007 | Palapudi | ............. | G06F 17/3089 |

(Continued)

FOREIGN PATENT DOCUMENTS

WO    WO 2014074799 A1 *    5/2014    ............. G06Q 50/01

*Primary Examiner* — Shirley Zhang
(74) *Attorney, Agent, or Firm* — Byrne Poh LLP

(57) ABSTRACT

Systems and methods are provided for notifying a user regarding movement of a content item which the user has previously expressed interest in, to a new network location. In one or more aspects, a system includes a notification generation component configured to generate a notification indicating a content item has been moved from a first content source to a second content source in response to movement of the content item from the first content source to the second content source. The system further includes a notification posting component configured to send the notification to a device or an account of a user based in part on a subscription of the user to the first content source or the content item.

20 Claims, 14 Drawing Sheets

(56) References Cited

U.S. PATENT DOCUMENTS

| | | | | |
|---|---|---|---|---|
| 2007/0282959 | A1* | 12/2007 | Stern | H04L 67/26 709/206 |
| 2008/0065604 | A1* | 3/2008 | Tiu | G06F 17/30867 |
| 2008/0155112 | A1* | 6/2008 | Ma | H04L 12/1859 709/231 |
| 2008/0155613 | A1* | 6/2008 | Benya | H04N 7/17318 725/89 |
| 2011/0066715 | A1* | 3/2011 | Schieder | H04L 67/04 709/223 |
| 2012/0084363 | A1* | 4/2012 | Tiu, Jr. | G06F 17/30867 709/204 |
| 2013/0013720 | A1* | 1/2013 | Huang | G06Q 10/10 709/206 |
| 2013/0060660 | A1* | 3/2013 | Maskatia | G06Q 30/00 705/26.35 |
| 2013/0219459 | A1* | 8/2013 | Bradley | H04L 63/08 726/1 |
| 2013/0238699 | A1* | 9/2013 | Reed | G06Q 50/01 709/204 |
| 2013/0254699 | A1* | 9/2013 | Bashir | G06F 3/0481 715/772 |
| 2014/0059217 | A1* | 2/2014 | Pizurica | H04L 43/08 709/224 |
| 2014/0122481 | A1* | 5/2014 | Petronijevic | G06F 17/30312 707/736 |
| 2014/0122592 | A1* | 5/2014 | Houston | H04L 67/1095 709/204 |
| 2014/0129661 | A1* | 5/2014 | Thyagaraja | G06F 9/542 709/207 |
| 2014/0156763 | A1* | 6/2014 | Dubetz | G06Q 10/107 709/206 |
| 2014/0250058 | A1* | 9/2014 | Thiruvidan | G06F 17/30011 707/608 |
| 2014/0281870 | A1* | 9/2014 | Vogel | G06F 17/246 715/220 |
| 2014/0351340 | A1* | 11/2014 | Houston | H04L 67/1095 709/204 |
| 2014/0372527 | A1* | 12/2014 | Zaveri | H04L 51/046 709/204 |

* cited by examiner

NOTIFYING USERS IN RESPONSE TO MOVEMENT OF A CONTENT ITEM TO A NEW CONTENT SOURCE

TECHNICAL FIELD

This application generally relates to systems and methods for notifying a user regarding movement of a content item which the user has previously expressed interest in, to a new content source.

BACKGROUND

A variety of media sharing and social networking system allow users to establish profiles and share content with other users via their respective profiles. For example, an established media sharing system can allow users to upload videos and associate those videos with their user account. In an aspect, the user account can embody a channel that includes videos uploaded by the user of the account. When a video is uploaded to the video sharing system by the user, it becomes part of the channel of the user that uploaded it. Other users that want to view the uploader's videos can go to that channel to access the uploaded content of interest. Recently, media sharing systems have allowed uploaders to move or copy a video from one channel to another once it had been uploaded. However, this can create a problem for viewers of the channels when they are seeking videos that have been moved.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
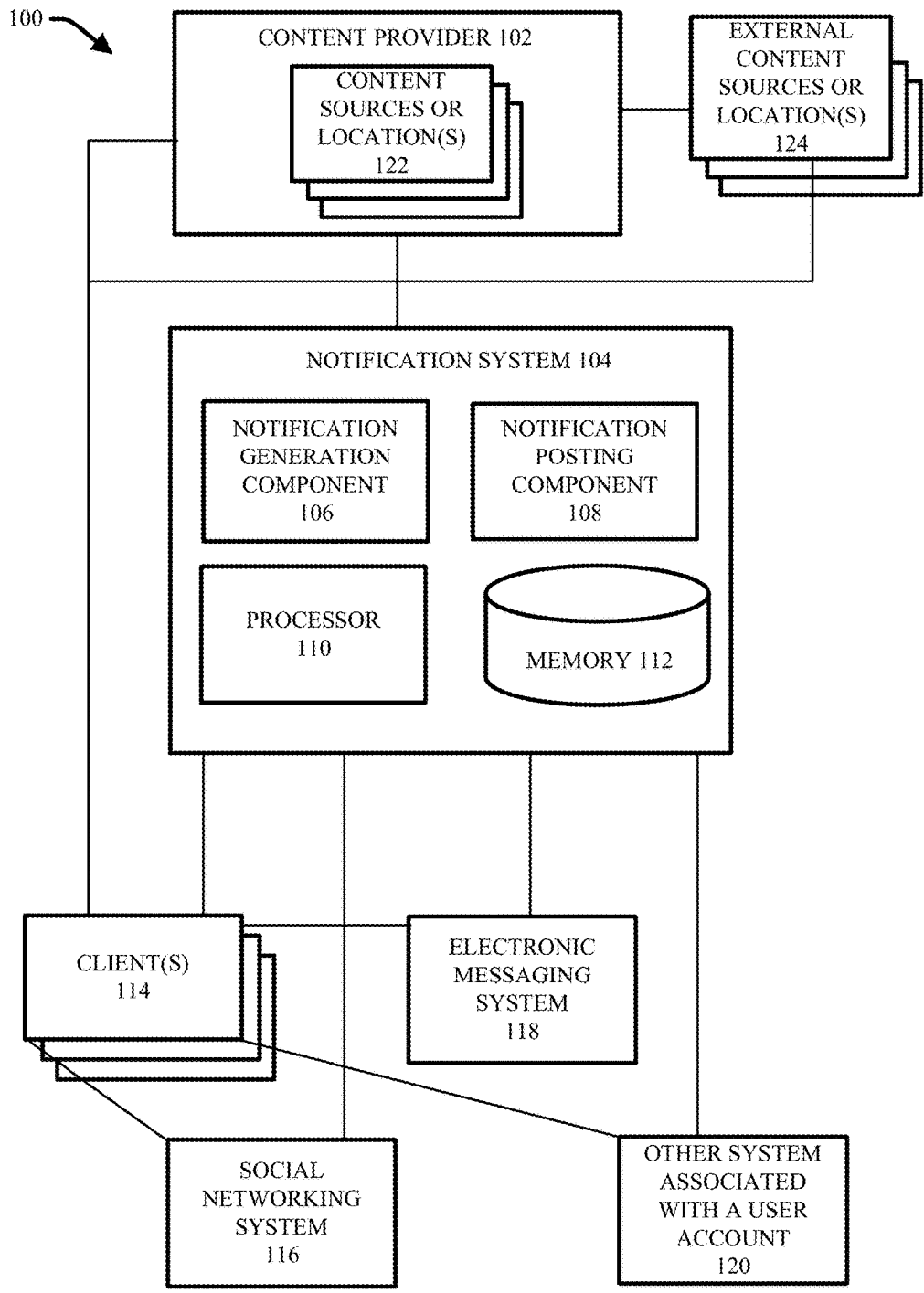
FIG. 1 illustrates an example system for notifying a user regarding movement of a content item, which the user has previously expressed interest in, to a new content source, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for notifying a user regarding movement of a content item, which the user has previously expressed interest in, to a new network source. Users frequently revisit certain content items provided at networked recourses. For example, users often desire to re-watch videos they've seen at a video sharing website or re-access articles they've read at a networked news source and share them with their friends. Accordingly, it is important to notify users in a satisfactory way when content they may desire to access again has been moved to a new network location so that the users can later find the content. For example, a video could be moved from a first network channel to a second network channel provided by a video sharing system, resulting in a new uniform resource locator (URL) for the video. In another example, a news article could be transferred from a primary homepage of a news website to an archived database accessible via hyperlink associated with the news website, also resulting in a new URL for the news article.

In an aspect, a system is provided that generates a notification indicating movement of a content item, that a user has previously expressed interest in, from a first network location to a new network location. The system further provides the notification to the user. The manner in which the notification is provided to the user can vary. In an aspect, the notification is provided to the user in the form of a notification message configured for presentation to the user via a notification system employed by a mobile device of the user. In another aspect, the notification is provided to the user in the form of a feed item that appears in a feed associated with an account of the user, such as a social network account. In another aspect, the notification is provided to the user in the form of an electronic message, such as an email or short messaging service (SMS) message. In one embodiment, the system automatically configures the manner in which a notification regarding movement of a content item to a new network location is provided to the relevant user(s) and what information the notification includes (e.g., a description of the type of movement, a reason for the movement, a time of the movement, a link to the content item at the new network location, etc.). In another embodiment, the user who initiates movement of the content item can select how a notification regarding the movement is provided to the relevant user(s) and what information the notification includes.

In one or more aspects, a system is provided that includes a notification generation component configured to generate a notification indicating a content item has been moved from a first content source to a second content source in response to movement of the content item from the first content source to the second content source. The system further includes a notification posting component configured to send the notification to a device or an account of a user based in part on a subscription of the user to the first content source or the content item.

In another aspect, a method is disclosed that includes using a processor to execute computer executable instructions stored in a memory to perform various acts. The acts can include generating a notification indicating a content item has been moved from a first content source to a second content source in response to movement of the content item from the first content source to the second content source, and sending the notification to a device or an account of a user based in part on a subscription of the user to the first content source or the content item.

Further provided is a tangible computer-readable storage medium comprising computer-readable instructions that, in response to execution, cause a computing system to perform various operations. These operations can include generating a notification indicating a content item has been moved from a first content source to a second content source in response to movement of the content item from the first content source to the second content source. The operations can further include identifying one or more users that have interest in the content item based in part on a level of prior interaction with the first content source or the content item, and sending the notification to a device or an account of the one or more users in response to the identifying.

Referring now to the drawings, with reference initially to FIG. 1, presented is a diagram of an example system 100 for notifying a user regarding movement of a content item, which the user has previously expressed interest in, to a new network location, in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes content provider 102, one or more external content sources/locations 124, notification system 104, one or more clients 114, social networking system 116, electronic messaging system 118, and/or another system associated with a user account 120. The various components of system 100 can be connected either directly or via one or more networks (e.g., the Internet, a cellular network, a local area network (LAN), etc.). In an aspect, content provider 102 can include notification system 104.

Notification system 104 is configured to facilitate notifying a user regarding movement of a content item provided by content provider 102, which the user has previously expressed interest in, to a new content source/location either within content provider 102 or at an external content source/location. For example, notification system 104 can send a notification message to a client device 114 of a user who has previously subscribed to a first content source 122 provided by content provider 102, or generate a feed item at an account of the user having a relevant information feed, with information indicating a content item located at the first content source 122 has been transferred to a second content source 122 provided by content provider 102. In another example, notification system 104 can send a notification message to the client device 114 of a user who has previously subscribed to the first content source 122 or generate a feed item at an account of the user, with information indicating a content item located at the first content source 122 has been copied to a second content source provided at external content location 124 (e.g., remote from content provider 102). According to this example, the user may be interested in knowing about the copying of the content item at the second content source because the second content source may provide fewer advertisements in association with accessing the content item or the second content source may provide free access to the content item while the first content source provided only paid access to the content item. Such information regarding details associated with accessing the content item at the second content source can also be included in the notification.

Content provider 102 can include an entity configured to provide content or content items to a user at a client device 114 via a network (e.g., the Internet). For example, content provider 102 can include a website or application configured to present pictures, articles, blogs, videos, or other types of content items to client devices 114 via a network. According to this example, the content provided on by the website or application can be configured for downloading, streaming or merely viewing at a client device via the network. In another aspect, content provider 102 can include an information store that provides access to data included in the information store via a network.

As used herein, the term content item refers to any suitable data object that can be linked to and accessed or otherwise shared via a network and includes but is not limited to: documents, articles, messages, webpages, programs, applications, and media items. In an aspect, a content item includes a data object that can be identified by a URL. The term media content or media item can include but is not limited to: video, live video, animations, video advertisements, music, music videos, sound files, pictures, and thumbnails. In some aspects, the term media content or media item includes a collection of media items, such as a playlist including several videos or songs.

In an exemplary embodiment, content provider 102 includes a streaming media provider configured to provide streamed media to client devices 114 over a network. The media can be stored in memory associated with the media provider and/or at various servers employed by media provider and accessed by client devices 114 using a networked platform (e.g., a website platform, a cellular application) employed by the media provider. For example, the media provider can provide and present media content to a user via a website that can be accessed by a client device 114 using a browser. In another example, the media provider can provide and present media to a user via a mobile/cellular application provided on a client device 114 (e.g., where client device 114 is a smartphone or the like).

Content items provided by content provider 102 can be respectively associated with content sources and/or content locations 122 provided by the content provider 102. A content source includes a source of content that can be distinguished from another source of content and can be used to organize related content. For example, a content source can include a website, a webpage, a database, a folder, a file, a shared network folder, a user account, a user profile, etc. A content location refers more specifically to a URL for a content item that points to a location of the content item as associated with or provided by a content provider (e.g., content provider 102).

In an aspect, users and/or client devices 114 respectively associated with the users, can become affiliated with a content source. For example, a user can express an interest in a content source by selecting a widget that indicates a "liking" of the content source or by associating the content source in a "favorites" file employed by the user. In another example, a user can express an interest in a content source by subscribing to the content source and/or following activity associated with the content source (e.g., following updates or changes to the content source, other user interaction with the content source, social media associated with the content source, etc.). In yet another example, where a content source is another user's profile (e.g., a social network profile and the like), a user can express interest in the content source by associating themselves with the other user's profile (e.g., befriending the other user and excepting association of each other as friends at a social network, following the other user's social networking activity, etc.).

In an aspect, in response to affiliation with a content source by a user and/or client device 114 employed by the user (e.g., via liking, favoriting, subscribing, following, . . . ), the user can receive information related to activity associated with the content source. For example, the user can opt to receive information related to updates or changes to the content source, other user interaction with the content source, or social media attention associated with the content source. The manner in which such information is provided to the user can vary. In some aspects, the information can be provided to the user via an electronic message. In another aspect, the information can be presented to the user via a homepage or user profile/account of the user. For example, information related to activity associated with a content source 122 provided by content provider 102 and subscribed to by a user, can be presented to the user via a notification area of a homepage of a user account the user has established with the content provider 102.

In another example, once subscribed to a content source, feed items generated by the content source can be syndicated to a feed owned or controlled by the subscriber(s). For example, various social networks (e.g., social networking system 116 and content providers (e.g., a streaming media provider) have information feeds (or multiple information feeds) associated therewith. These information feeds present a list of feed items which represent actions or events relating to one or more content sources provided by the various social networks or content providers, respectively. The list is continuously updated based on recent activity. For example, the uploading and publishing of a new video to a content source 122 provided by content provider 102 can generate a feed item that is displayed at information feeds owned or controlled by (e.g., via an established user account) respective subscribers to the content source.

According to this example, information related to activity associated with a content source subscribed to by a user, can be presented to the user as a feed item of an information feed owned or operated by the user. In an aspect, feed items are published at information feeds provided by the content provider at which the content source associated with the generated feed item is provided. (e.g., a feed item generated in association with activity related to content source 122 is published at an information feed owned by the user and provided by content provider 102). In another aspect, feed items generated based on activity related to a content source provided by a content provider can be published at information feeds associated with an external system or source (e.g., a feed item generated in association with activity related to content source 122 is published at an information feed owned by the user and provided by social networking system 116 or another system associated with a user account 122). In yet another aspect, feed items can be sent to an aggregate feed for a user that includes feed items generated by a plurality of content sources subscribed to by the user and respectively provided by a plurality of different content providers.

In an aspect, content provider 102 includes a plurality of content sources and content locations 122. For example, content provider 102 can provide a plurality of different webpages representing, menus, folders, and subfolders that organize content provided by content provider 102. In an aspect, where content provider 102 is a media provider configured to provide a variety of streaming media (e.g., video and/or audio) to client devices 114, a content source and/or location 122 can include a channel.

A channel includes a group of one or more media items that can be subscribed to by a user. In an aspect, a channel can include a set of videos or songs uploaded to a media provider by a particular entity and grouped together based on association with the particular entity. For example, individual users can set up individual channels with the media provider and associate videos they upload with their individual channels, respectively. A user can further view content provided by another user's channel and subscribe to the specific channel to receive updates regarding activity associated with the channel (e.g., via an information feed associated with an account of the user). In another example, a media publisher can associate a single show provided by the media publisher on a channel. The channel can include several episodes or new videos related to the show. In yet another example, a channel can include a group of videos or television shows.

As previously noted, notification system 104 facilitates notifying a user regarding movement of a content item provided by content provider 102, which the user has previously expressed interest in, to a different content source/location either within content provider 102 (e.g., from a first content source 122 to a second content source 122) or at an external content source/location 124 (e.g., from a first content source 122 to a second content source 124), and vice versa. An external content source or location can include a content source or location remote from content provider that can host a content item. For example, an external content source or location 124 can include another content provider or a subdivision of the other content provider (e.g., a webpage, a folder, a database, a file, an application, etc.).

The phrase "previously expressed interest in," encompasses an active declaration of a user's interest in a content item by the user and an inferred interest the user has in a content item, as inferred by notification system 104. In an aspect, an active declaration of interest in a content item is discerned based on the various manners in which a user can become affiliated with a content source discussed above (e.g., (e.g., via liking, favoriting, subscribing, following, etc.). For example, a user can subscribe to a content item, favorite a content item, or like a content item. In another aspect, by affiliating oneself with a particular content source, the user is consider to have an inferred interest in content items provided by the content source. For example, by subscribing to channel "ABC," the subscriber can be considered to have an inferred interest in all videos provided by channel "ABC." Additional information that can indicate an a previously expressed interest in a content item by a user can include but is not limited to, whether the user has previously accessed (e.g., viewed, watched, listened to, etc.) the content item, a number of times the user has re-accessed the content item, whether the user has provided comments or feedback regarding the content item, whether the user has bookmarked the content item, and whether the user has shared the content item.

Movement of a content item from a first content source to a second content source can encompass a variety of actions, including but not limited to, transfer of a content item from the first content source to the second content source, copying of the content item from the first content source to the second content source, uploading of a content item from a first content source to a second content source, and downloading a content item from a first content source to a second content source. In an aspect, movement of a content item from a first content source to a second content source results in establishment of a new URL for the content item at the second content source. When a content item is transferred from a first content source to a second content source, the content item is removed from the first content source and added to the second content source. However, when a content item is copied from a first content source to a second content source, the content item is not removed from the first content source.

For example, where content provider 102 is a media provider, movement of a content item can include transferring of a video from a first channel provided by the media provider to a second channel provided by the media provider. In another example, movement of a content item can include copying of a video playlist from the first channel to the second channel. Still in another example, movement of a content item can include uploading of a video from a first content source remote from the media provider to a second content source provided by the media provider. According to this example, the movement can be considered the creation of a new content item at the second content source.

In an aspect, in addition to movement of a content item, notification system 104 can also facilitate notifying a user regarding an update or modification to a content item provided by content provider 102, which the user has previously expressed interest in. For example, notification system 104 can notify users regarding publication of a new version of a content item or whether the content item has been associated or disassociated with a fee for access. For example, where the content item is a video, notification system 104 can notify a user regarding publication of a new version of the video. The new version could be modified based on formatting, language, color, length, quality, content, addition of subscripts, addition of hyperlinks, addition of overlays, addition of information tags, or addition of various other features.

The manner and form of a notification provided by notification system 104, regarding movement of a content item from a first content source to a second content source, (herein referred to as a movement notification) or regarding a modification to a content item (herein referred to as a modification notification), can vary. Notification system 104 can include notification generation component 106 to generate a movement and/or modification and notification posting component 108 to facilitate providing the movement and/or modification to relevant users. A user is considered relevant if the user has previously expressed an interest in the content item, as defined above (e.g., users that have subscribed to the content item and/or the first content source from which the content item was moved).

In an aspect, a movement and/or modification notification can be provided to a relevant user via a notification message sent directly to the user's client device 114. For example, notification generation component 106 can configure a notification message for display at a client device 114 of the relevant user via a notification system or application provided at the client device 114. The notification posting component 108 can further send the notification to the client device 114 for processing thereof. According to this example, the notification can be presented to the relevant user along with various other notifications, unrelated to notifications generated by notification system 104 (e.g., unrelated to notifications regarding movement of content, associated with the user, to a new content source). In another aspect, a movement and/or modification notification can be provided to a relevant user via a notification message sent to the client device 114 of the relevant user as an SMS message or multimedia message. According to this aspect, notification generation component 106 can configure the SMS message and notification posting component 108 can employ a short messaging service to deliver the message to the client device 114. In another aspect, notification generation component 106 can configure a movement and/or modification notification message as an email and notification posting component can employ an electronic messaging system to send the email to an email account employed by a relevant user.

In yet another aspect, notification generation component 106 can configure a movement or modification notification for rendering as a feed item at an information feed owned or under the control of a relevant user. The information feed can display a list of feed items representing activity associated with content sources the relevant user is affiliated with (e.g., subscribed to). In an aspect, the information feed is provided by the content provider 102 associated with the content item that was moved (e.g., the content item for which the movement notification is based). According to this aspect, the information feed can be associated with a user account for the related user and include feed items regarding activity related to various content sources 122 provided by the content provider 102 that the related user is subscribed to. In another aspect, the information feed can be provided at an account of the related user at an external social networking system 116 and include feed items related to other content sources (e.g., friends profiles) at the external social networking system that the related user is subscribed to. Still in yet another aspect, the information feed can be provided at an account of the related user at another system at which the related user has an account that includes an information feed (e.g., an account that aggregates feed items regarding activity related to content sources the user is subscribed to and provided by various different content providers). Notification posting component 108 can identify an appropriate information feed or feeds for which to send a movement and/or modification notification configured for display as a feed item and send the notification to the appropriate information feed.

A movement and/or modification notification can include a variety of information related to the movement or modification of a content item. In an aspect, a movement notification can describe the type of movement that was performed regarding the content item. For example, a movement notification can indicate what the content item is and whether it was transferred, copied, or uploaded from a first source to a second source. A movement notification can also provide information describing attributes of the first source and/or the second source. A movement notification can also include information including but not limited to, time stamp regarding a time at which the content item was moved, information regarding the user who initiated the movement, the reason for the movement, a link or hyperlink to the content item at the new location and/or an image or embedded object (e.g., video, animation, etc.) representing the content item.

In some aspects, a notification message can inform a relevant user that a content item will be moved in the future. According to this aspect, the notification can include information indicating where the content item will be moved and when. In another aspect, a notification message include minimal information that can be understood by a user as an indication a content item the user has previously expressed interest in has been moved or will be moved. For example, the notification message can include a general movement notification symbol or icon. According to this aspect, the notification message can include a link to further information regarding the content item, the movement of the content item, and the new source to which the content item was or will be moved.

A modification notification can include information describing the modification to the content item, the reason for the modification, the time of the modification, where a previous version of the content item can be found and/or where a new version of the content item with the modification can be found.

Figure 2:
FIG. 2 presents an example user interface displaying a notification informing a user of who expressed interest in a content item, that the content item has been moved to a new content source, in accordance with various aspects and embodiments described herein.
Figure 3:
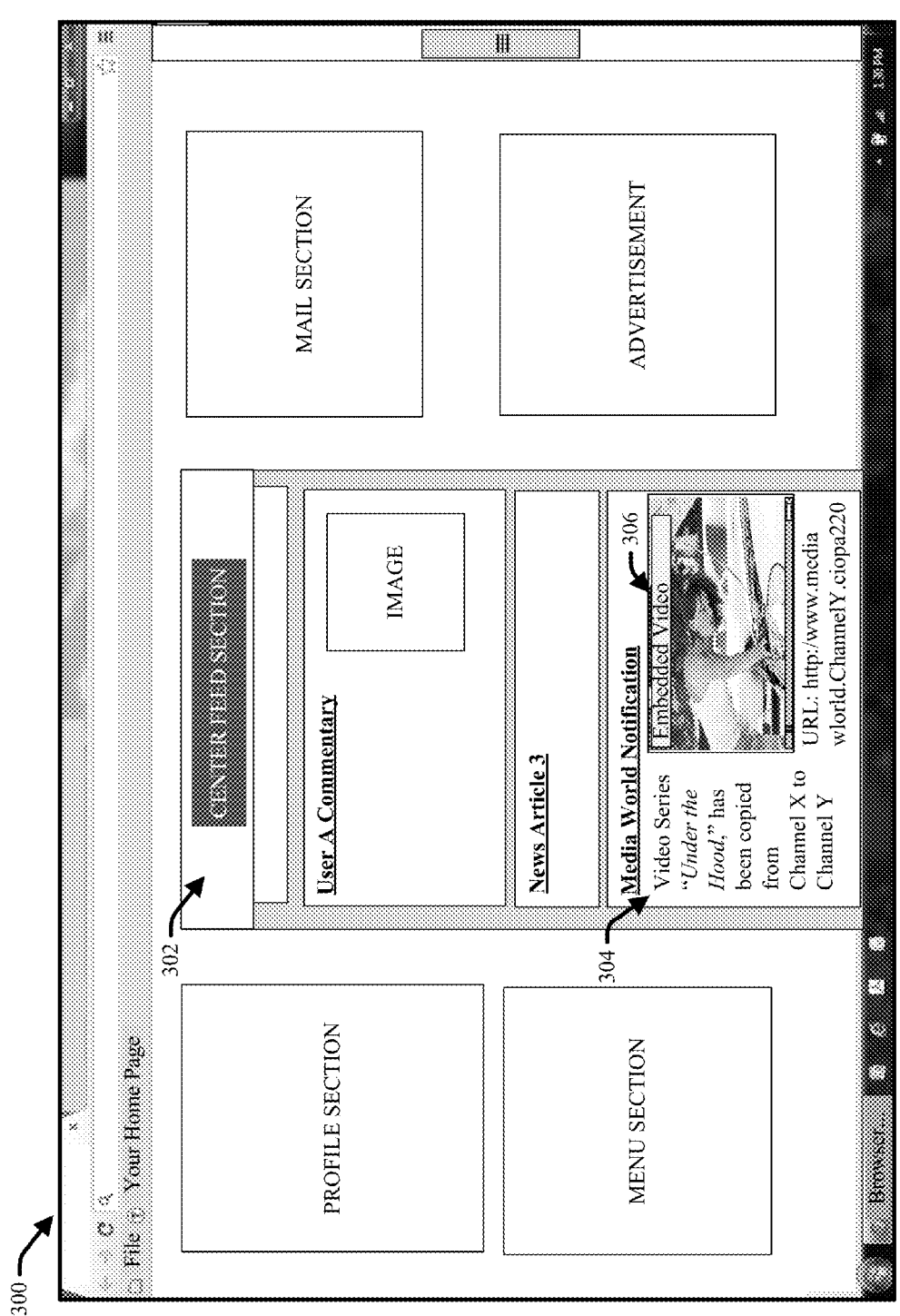
FIG. 3 presents another example user interface displaying a notification informing a user of who expressed interest in a content item, that the content item has been moved to a new content source, in accordance with various aspects and embodiments described herein.
Figure 4:
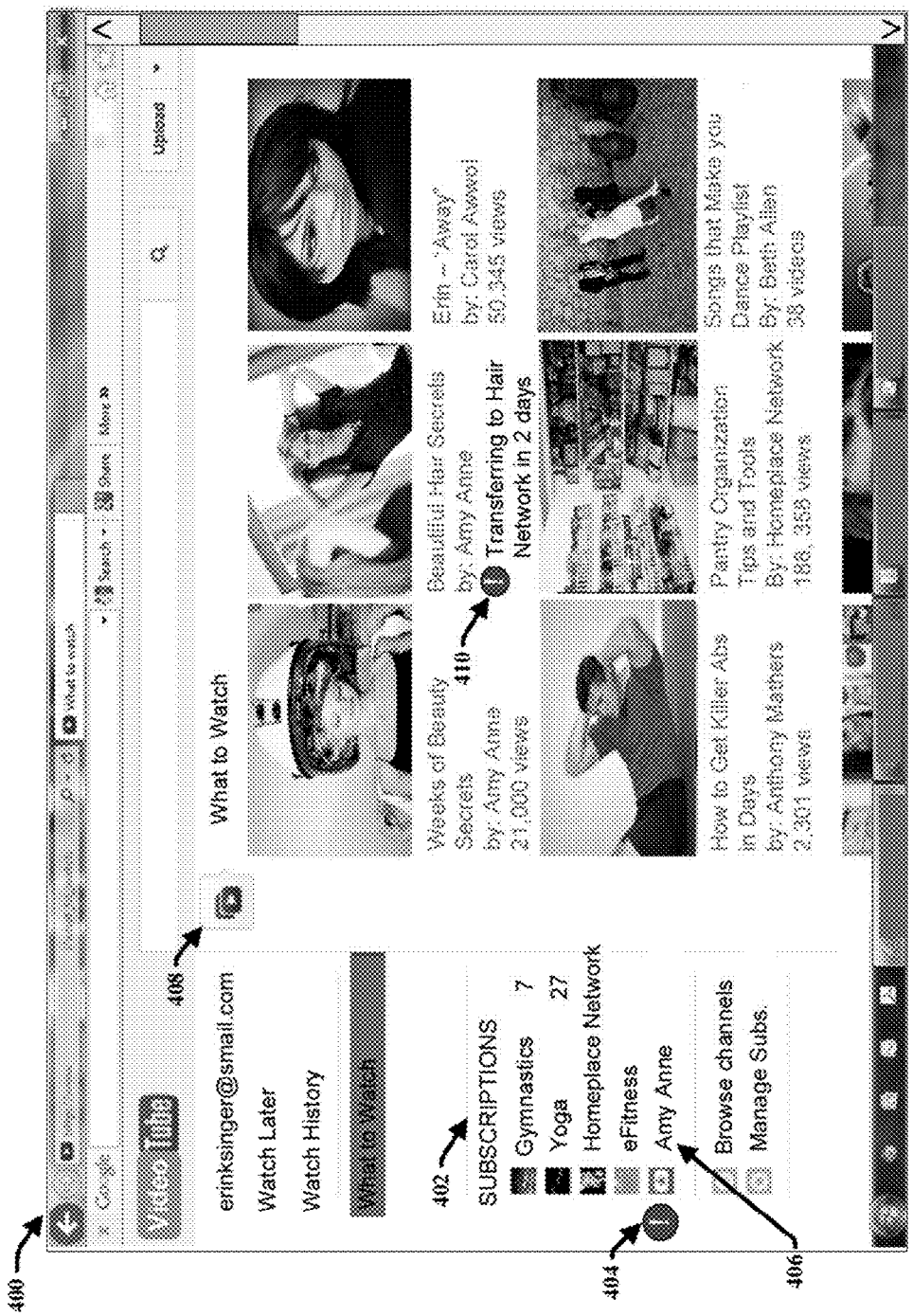
FIG. 4 presents an example user interface displaying a notification informing a user of who expressed interest in a content item, that the content item will be moved to a new content source, in accordance with various aspects and embodiments described herein.

FIGS. 2-4 provide example interfaces at which notifications presented to a relevant user regarding movement of a content item a user has previously expressed interest in. The notifications are exemplified in different rendering mediums and including different types of information. Repetitive description of like elements employed in respective embodiments of systems and interfaces described herein are omitted for sake of brevity.

FIG. 2 presents an example user interface 200 displayed via mobile phone such as a smartphone. The interface includes various notifications relevant to the user of the mobile phone. For example, the interface includes notifications related to Prime News 202, Media World 204, and ChatRoom 208. In an aspect, Prime News 202, Media World 204, and ChatRoom 208 are content providers frequently visited by the user and/or for which cellular applications associated with the respective content providers are provided on the mobile phone. A notification system employed be the mobile phone can generate the interface 200 currently displayed with the notifications regarding the relevant applications. In an aspect, the notification 206 related to Media World 204 was generated by and received from a notification system 104, as described herein. For example, the notification 206 indicates that the video entitled "Jam Ball" by Mili Miller has been transferred from Channel X to Channel Y. The notification also includes a time stamp 210 indicating a time when the video was transferred. The notification system employed by the mobile phone can be configured to receive, process, and present the notification 206 via interface 200.

In an aspect, notification system 104 generated and sent this notification 206 to the mobile phone because the user of the mobile phone previously indicated in interest in the video "Jam Ball." For example, the user may have subscribed to Channel X, indicating an inferred interest in videos provided by Channel X. In another example, the user may have provided a stronger indication of interest in "Jam Ball" by liking the video, watching the video multiple times, sharing the video with her friends, posting the video at a social networking account owned by the user, or saving the video in a favorites file at a user account the user has established with media world.

FIG. 3 presents another example user interface 300 displayed via a larger display screen, such a display screen of a desktop or laptop computer or a tablet PC. The interface presents an account of a user that includes an information center feed section 302 configured to display feed items associated with content sources relevant to the user. The user account can be provided by a variety of systems. In an aspect, the user account is associated with a media provider that provides streaming media. In another aspect, the user account is associated with a social networking system. In yet another aspect, the user account can be associated with web browsing system that presents information to the user relevant to various network sources the user is subscribed to or has indicated in interest in.

Center feed section 302 includes a movement notification 304 related to content provider Media World that is configured to display as feed item in center feed section 302. In an aspect, the movement notification 304 was generated by and received from notification system 104, as described herein. For example, the notification 304 indicates that the video series entitled "Under the Hood" has been copied from Channel X to Channel Y. The notification also includes an embedded version of the video with a link to the video at Channel Y.

In an aspect, notification system 104 generated and sent this notification 304 to the user account displayed via interface 300 for presentation as a feed item in center feed section 302 because the user associated with the previously indicated in interest in the video series "Under the Hood." For example, the user may have subscribed to Channel X, indicating an inferred interest in videos provided by Channel X. In another example, the user may have provided a stronger indication of interest in the video series "Under the Hood" by liking the video series, watching one or more videos in the series multiple times, sharing the video series with her friends, posting the a link to the video series at a social networking account owned by the user, or saving the video series in a favorites file at a user account the user has established with media world.

FIG. 4 presents another example user interface 400 displayed at a user device and including a movement notification in accordance with aspects and embodiments described herein. In an aspect, interface 400 presents a webpage (e.g., a homepage or other webpage) associated with an account a user has established with a media provider entitled VideoTube. In an aspect, VideoTube is configured to provide streaming videos to users and interface 400 facilitates navigating and consuming videos provided by VideoTube. The interface can include various menus and sections that organize and present media provided by VideoTube.

In an aspect, interface 400 includes a section entitled Subscriptions 402 that organizes channels and/or media items provided by VideoTube that the user is subscribed to. For example, the Subscriptions section 402 lists several channels the user is subscribed to, including gymnastics, yoga, homeplace network, efitness, and Amy Anne 406. Channel Amy Anne 406 has an icon 404 associated therewith. In an aspect, this icon is a movement notification icon that is understood by the user as indicating movement (e.g., past or future movement) of a media item provided by the channel Amy Anne 406. In an aspect, notification system 104 generated this icon in accordance with aspects described herein, based in part on subscription of the user to channel Amy Anne 406 and movement of a video provided by channel Amy Anne 406. In an aspect, movement notification icon 404 can be selected by the user to reveal information regarding the content item that is associated with the movement notification and information regarding movement of the content item.

Interface 400 also exemplifies another manner in which a movement notification can be presented to a user via user interface 400. In particular, interface 400 includes a section entitled What to Watch 408. This section can present thumbnails of various videos and channels the user may have an interest in watching. For example, this section can present videos and/or channels that are relevant to the user for various reasons (e.g., because the user is subscribed thereto, because the user has expressed interest in similar videos, because the videos or channels are currently popular amongst other users similar to the user, etc.). A thumbnail representing a video entitled "Beautiful Hair Secrets" is displayed in the What to Watch section 408. This video is provided by channel Amy Anne 406, which the user is subscribed to. The thumbnail is further presented with a movement notification 410 indicating that the video will be transferred to a new channel Hair Network in 2 days. In an aspect, this movement notification was generated by notification system 104 in accordance with aspects and embodiments described herein. The user is not subscribed to Hair Network and may want to find the video "Beautiful Hair Secrets" in the future. However, by receiving the notification 410 of the video transfer, the user can subscribe to "Hair Network" so that the user can later easily find the video "Beautiful Hair Secrets."

Referring back to FIG. 1, client device 114 can include any suitable computing device associated with a user and configured to receive access content provider 102 via a network and/or receive notifications from notification system 104 via a network. For example, a client device 114 can include a desktop computer, a laptop computer, a television, an Internet television, a mobile phone, a smartphone, a tablet personal computer (PC), or a personal digital assistant (PDA). As used in this disclosure, the terms "content consumer" or "user" refer to a person, entity, system, or combination thereof that employs system 100 (or additional systems described in this disclosure) using a client device 114. The one or more networks (not depicted) via which one or more component of system 100 can connect can include wired and wireless networks, including but not limited to, a WAN (e.g., the Internet or a cellular network), a local area network (LAN) or a personal area network (PAN). For example, client device 114 can communicate with content provider 102, notification system 104, social networking system 116, electronic messaging system 118, or another system associated with a user account 120, (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Figure 5:
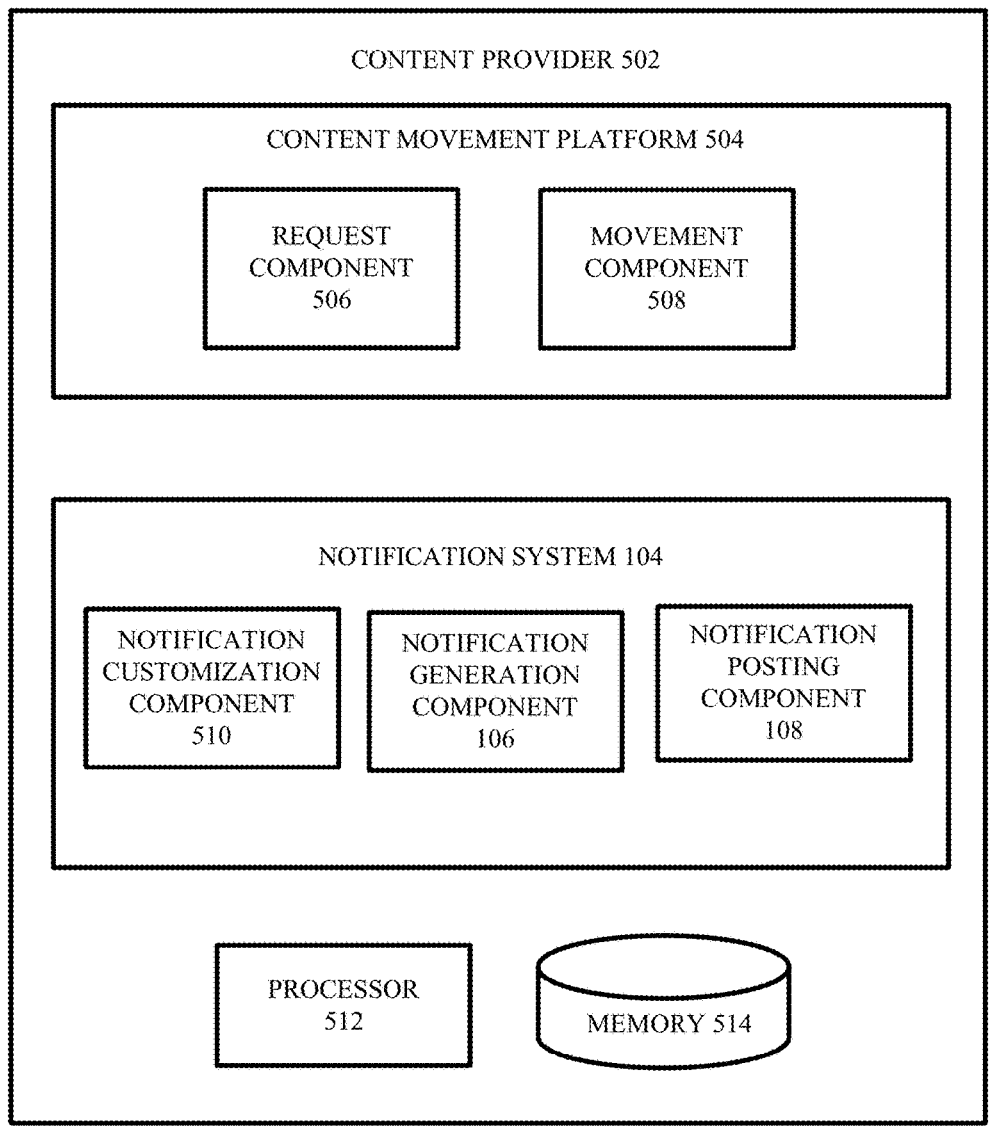
FIG. 5 presents an example content provider employing a notification system to notifying a user regarding movement of a content item, provided by the content provider, which the user has previously expressed interest in, to a new content source, in accordance with various aspects and embodiments described herein.

FIG. 5 illustrates an example content provider 502 employing notification system 104 to facilitate notifying a user regarding movement of a content item which the user has previously expressed interest in, to a new content source/location in accordance with various aspects and embodiments described herein. Content provider 502 can include same or similar features and functionalities of as content provider 102. Content provider can include memory 514 for storing computer executable components and instructions and processor 512 to facilitate operation of the instructions (e.g., computer executable components and instructions) by content provider 502. Repetitive description of like elements employed in respective embodiments of systems and interfaces described herein are omitted for sake of brevity.

In an aspect, content provider 502 is a media provider that has access to a voluminous quantity (and potentially an inexhaustible number) of shared media (e.g., video and/or audio) files. The media provider can further stream these media files to one or more users at respective client devices of the one or more users over a network. In an aspect, the media provider includes a plurality of channels and media items that users can subscribe to. Content provider 502 can include content movement platform 504 to facilitate moving content items provided by content provider 502 and/or to content provider 502. For example, content provider 502 can include a media provider that has access to a voluminous quantity (and potentially an inexhaustible number) of shared media (e.g., video and/or audio) files. The media provider can further stream these media files to one or more users at respective client devices of the one or more users over a network. In an aspect, the shared media is organized into a plurality of channels and that users can subscribe to. According to this aspect, a user of media provider can upload a video to a first one of the plurality of channels and employ content movement platform 504 to move the video to a second one of the plurality of channels.

Content provider 502 includes notification system 104 to facilitate notifying relevant users regarding movement of content items between content sources associated with content provider (e.g., from the first channel to the second channel in the above example). Content movement platform 504 can include request component 506 and movement component 508. Request component 506 is configured to receive a request to move a content item provided by content provider 502 from a first content source to a second content source in one of the various manners described herein (e.g., transferring, copying, uploading, downloading, etc.). In an aspect, the first and second content sources are provided by content provider 502. For example, the first and second content sources can include channels provided by a media provider, first and second files provided by a document retention system, or first and second webpages provided by a website. In another aspect, one of the first or second content sources are provided by content provider 502 while the other one of the first or second content sources are remote from the content provider 502. For example, the first content source can be provided by a media provider while the second content source can be provided by a virtual music retail store.

In an aspect, requests to move a content item provided by content provider 502 can only be received from a user affiliated with ownership of the content item and/or the source of the content item, such as user who created the content item, a user who uploaded the content item to content provider 502, a user who controls or manages the content item, a user who controls, owns or manages a channel at which the content item is provided, etc. Movement component 508 is configured to move a content item from a first content source to a second content source in response to a request received by request component 506.

As previously described, notification system 104 facilitates notifying a user regarding movement of a content item provided by a content provider, which the user has previously expressed interest in, to a different content source/location either within the content provider 502 or at an external content source/location, and vice versa. Accordingly, when employed by content provider 502, notification system 104 can notify relevant users regarding movement of a content item provided by content provider and/or to content provider, in response to movement of the content item by movement component 508.

Notification generation component 106 is configured to generate movement notifications in response to movement of a content item provided by content provider 502 and/or to content provider and notification posting component 108 is configured to send the notification to relevant users. In one embodiment, information included in a notification and the manner in which it is provided to a user (e.g., as a cellular notification, as a text message, as a feed item, as an email etc.) is automatically determined by notification system 104. For example, notification generation component 106 can be configured to employ one or more algorithms stored in memory that influence the information to include in a notification based on various factors, including but not limited to: type of movement of the content item (e.g., transfer, copy, upload, download, etc.), type of content item, reason for movement of the content item, characteristics of the source from which the content item was moved, characteristics of the source to which the content item was moved, time of movement, preferences of the user that initiated the movement, preferences of a user that will receive the notification, whether the content item was previously published, how long the content item was published, popularity of the content item, and operating parameters of the device at which the notification will be displayed.

For example, notification generation component 106 can be configured to include information in a notification indicating that a content item was transferred in response to transfer of the content item from a first content source to a second content source. However, if the transferred content item was never publically published, notification generation component 106 can be configured to override generation of a notification with information indicating the transfer. According to this scenario, no notification can be generated in response to the transfer of the content item, or notification generation component 106 can be configured to generate a notification indicating the content item has been published at the source it was transferred to.

Similarly, notification posting component 108 can employ one or more algorithms stored in memory that automatically control how a notification is provided to a relevant user. For example notification posting component 108 can determine or infer whether to configure the notification as a feed item and what notification feed to post the feed item, and/or whether to configure the notification as a cellular notification, an email, a text message, etc., based on one or more of the various factors listed above as well as a location of the device at which the notification is rendered and context of the recipient user/device. For example, notification posting component 108 can be configured to not configure a notification for rendering as a feed item when the content item that was moved is old or has been published for a long time (e.g., over a month old).

In another embodiment, information included in a notification and the manner in which it is provided to a user (e.g., as a cellular notification, as a text message, as a feed item, as an email etc.) can be controlled in whole or in part by the user that initiates the movement of the content item (e.g., via request component 506). According to this embodiment, notification system 104 can include notification customization component 510. Notification customization component 510 can allow a user that makes a request to move a content item, (e.g., via request component 506), to provide input regarding the information to include in a movement notification that is sent to relevant users to notify them about the movement. Notification customization component 510 can also allow the user that makes the movement request to provide input regarding how they would like the notification to be provided to relevant users (e.g., as a text message, as an email, as a feed item), when they would like the notification to be provided, and/or what relevant users to provide the notification to. For example, notification customization component 510 can provide a drop down menu with options for the requesting user to select a type of movement of the content item, how the notification should be provided to relevant users and whether the notification should be rendered as a feed item. Notification generation component 106 can then generate a notification based on the items selected. In another example notification customization component 510 can allow a user that initiates a request to move a content item to freely input information, (e.g., custom messages), to include in a movement notification regarding the movement of the content item.

Figure 6:
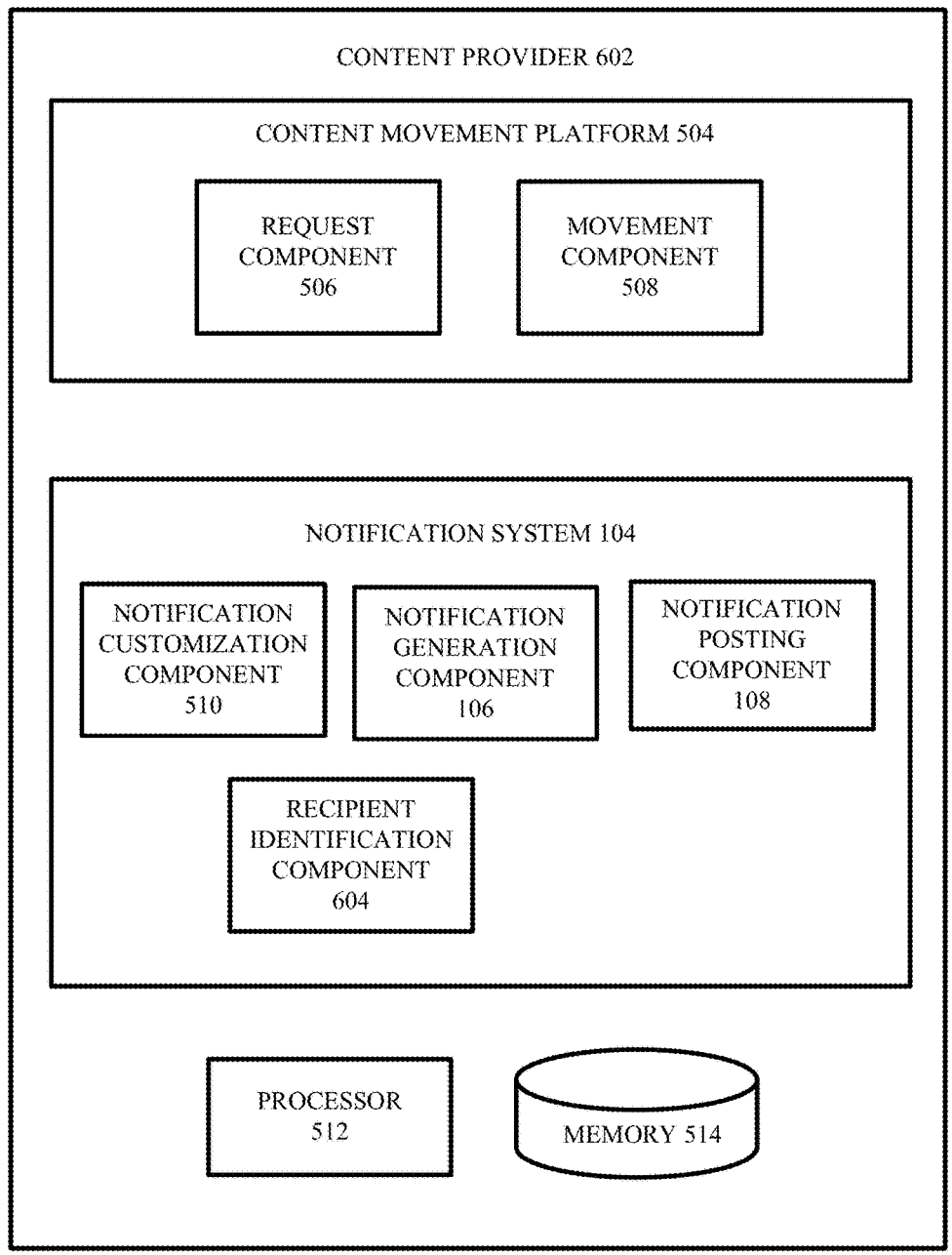
FIG. 6 presents another example content provider employing a notification system to notifying a user regarding movement of a content item, provided by the content provider, which the user has previously expressed interest in, to a new content source, in accordance with various aspects and embodiments described herein.

FIG. 6 illustrates another example content provider 602 employing notification system 104 to facilitate notifying a user regarding movement of a content item which the user has previously expressed interest in, to a new content source/location in accordance with various aspects and embodiments described herein. Content provider 602 can include same or similar features and functionalities of as content providers previously described. Repetitive description of like elements employed in respective embodiments of systems and interfaces described herein are omitted for sake of brevity.

Content provider 602 is similar to content provider 502 with the addition of recipient identification component 604 to notification system 104. Recipient identification component 604 is configured to determine or infer users to which a movement notification and/or modification notification should be provided. As previously noted, movement and/or modification notifications are intended for users that have at least previously expressed an interest in a content item that has been moved because it is assumed that such users would like to be informed where the content item can be found in the event they would like to re-access the content item in the future. Recipient identification component 604 can employ various mechanisms to identify users that have previously expressed interest in a moved content item, referred to as relevant users.

In an aspect, recipient identification component 604 can consider a user relevant if the user has subscribed to a first content source from which the content item was moved. In another aspect, recipient identification component 604 can consider a user relevant if the user has liked, favorited, or saved the content item. In another aspect, recipient identification component 604 can consider a user relevant if the user has accessed the content item more than once. In an embodiment, notification posting component 108 can send a movement and/or modification notification to all users identified as relevant by recipient identification component 604.

In another embodiment, notification posting component 108 can send a movement and/or modification notification to users that have an level of interest in a content item above a predetermined threshold. According to this aspect, recipient identification component 604 can apply one or more filters to determine or infer a level of user interest in a content item. For example, recipient identification component 604 can analyze received information relating to user interaction with the content item or the source of the content item and type of user interaction with the content item or source of the content item to determine or infer a level of user interest in the content item. These factors can include but are not limited to: whether the user has previously accessed (e.g., viewed, watched, listened to, etc.) the content item or content source, a number of times the user has re-accessed the content item or content source, how recently the user re-accessed the content item or content source, whether the user has provided comments or feedback regarding the content item or content source, whether the user has bookmarked the content item or content source, whether the user has shared the content item, to whom the user has shared the content item, and how (e.g., via posting at a social networking site, via an email, etc.) the user shared the content item.

Recipient identification component 604 can also analyze received information relating to user preferences and user context to determine or infer a level of user interest in the content item. For example, recipient identification component 604 can analyze user watch history, types of content items a user prefers over others, types of content sources the user prefers over others, demographics of the user, location of the user, time of day, etc. Recipient identification component 604 can also consider user preferences and user context to determine or infer whether the user would like to receive a notification regarding movement of a content item, regardless of the level of interest the user has in the content item. For example, a user may receive however rarely acknowledge notifications regarding movement of content items associated with a particular source. According to this example, recipient identification component 604 can determine, based on learned user behavior, that the user is not interested in receiving movement and/or modification notifications regarding content items from the particular content source. Thus recipient identification component 604 can determine that the user should not receive movement and/or modification notifications regarding content items from the particular source.

Recipient identification component 604 can also analyze information relating to popularity of the content item or content source to determine or infer a level of user interest in the content item. For example, recipient identification component infer that a user would have a greater interest in a content item that is relatively new (e.g., has recently been published) as opposed to an older content item. Similarly, recipient identification component can infer that a user would have a greater interest that is popular amongst a plurality of users (e.g., as determined by number of times other users access the content item, share the content item, comment on the content item, etc.) and than a less popular content item. Further, recipient identification component 604 can infer that a user would have even greater interest in a content item that is popular amongst a group of users having a similar preference to the user.

Figure 7:
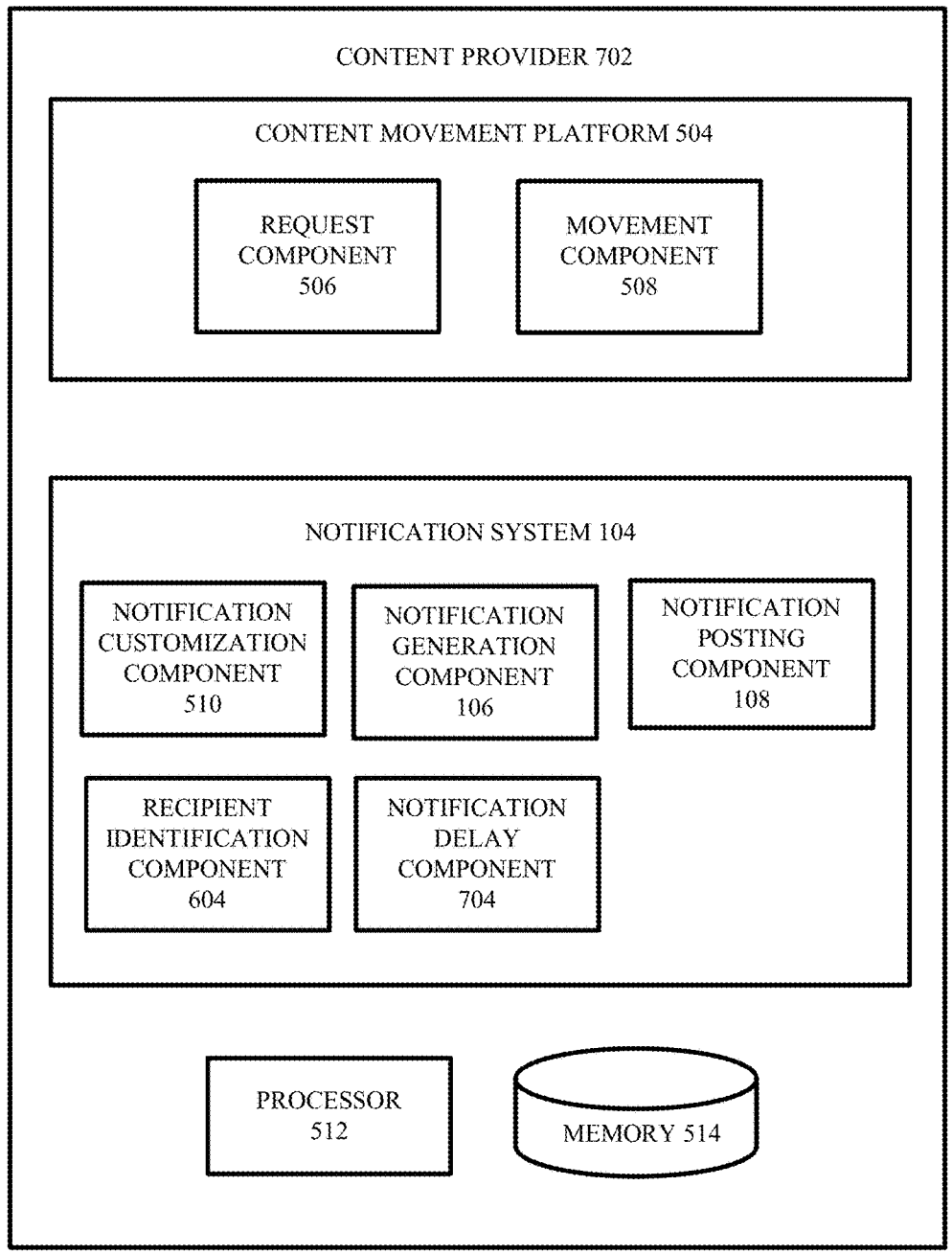
FIG. 7 presents another example content provider employing a notification system to notifying a user regarding movement of a content item, provided by the content provider, which the user has previously expressed interest in, to a new content source, in accordance with various aspects and embodiments described herein.

FIG. 7 illustrates another example content provider 702 employing notification system 104 to facilitate notifying a user regarding movement of a content item, which the user has previously expressed interest in, to a new content source/location in accordance with various aspects and embodiments described herein. Content provider 702 can include same or similar features and functionalities of as content providers previously described. Repetitive description of like elements employed in respective embodiments of systems and interfaces described herein are omitted for sake of brevity.

Content provider 702 is similar to content provider 602 with the addition of notification delay component 704 to notification system 104. In an aspect, notification delay component is configured to delay sending a movement and/or modification notification based on received input, from a user that initiated the movement or modification of the content item for which the notification is based, indicating a time at which the notification should be sent. For example, in association with customizing a notification via notification customization component 510, a user can indicate a future time at which the user would like a notification to be sent and notification delay component 704 can delay sending the notification until the future point in time.

In another aspect, notification delay component 704 is configured to delay sending a movement and/or modification notification to a recipient user based an inferred context of the recipient user. For example, notification delay component 704 can determine or infer a context of the recipient user in which the recipient user is unlikely to receive and acknowledge a notification and delay sending the notification until the user is in a context where they are more likely to receive and acknowledge the notification. According to this aspect, notification delay component 704 can infer or determine user contest based on time of day, day of the year, mobility state of the user, location of the user, whether the user is actively employing a user account to which the notification will be sent (e.g., as a feed item), user schedule/routine, etc. For example, notification delay component 704 can delay sending a notification to a mobile device of a recipient user while the user is at work or driving until the user is at home and not driving. In another example, notification delay component 704 can delay sending a notification to user until the user is actively employing (e.g., logged on and interacting with) a user account to which the notification will be sent as a feed item.

Figure 8:
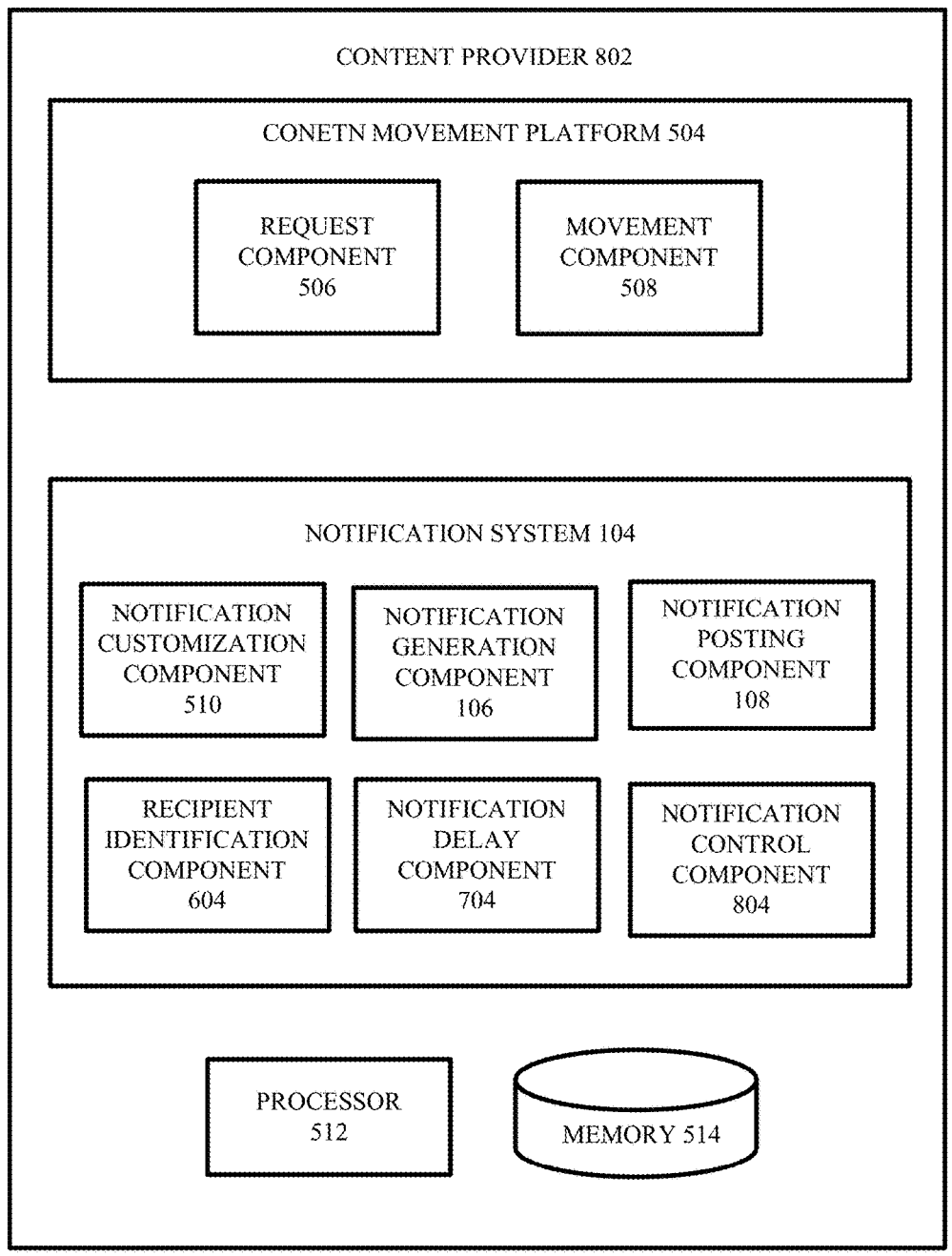
FIG. 8 presents another example content provider employing a notification system to notifying a user regarding movement of a content item, provided by the content provider, which the user has previously expressed interest in, to a new content source, in accordance with various aspects and embodiments described herein.

FIG. 8 illustrates another example content provider 802 employing notification system 104 to facilitate notifying a user regarding movement of a content item which the user has previously expressed interest in, to a new content source/location in accordance with various aspects and embodiments described herein. Content provider 802 can include same or similar features and functionalities of as content providers previously described. Repetitive description of like elements employed in respective embodiments of systems and interfaces described herein are omitted for sake of brevity.

Content provider 802 is similar to content provider 702 with the addition of notification control component 804 to notification system 104. Notification control component 804 is configured to allow potential recipient users of movement and/or modification notification to provide notification system 104 with declared preferences regarding receiving the movement and/or modification notifications. For example, notification control component 804 can receive input from a potential notification recipient (e.g., a user of content provider 802) regarding whether the user would like to receive movement and/or modifications (e.g., the user can opt in or opt out of receiving notifications), when the user would like to receive notifications, what content item(s) the user would like to receive notifications for, what content source(s) the user would like to receive notifications for, the manner in which the user would like to receive notifications (e.g., via a cellular notification, via email, via feed item, etc.), and information the user would like included in notifications. Notification system 104 can then apply user input received via notification control component 804 when generating and sending movement and/or modification notifications.

Figure 9:
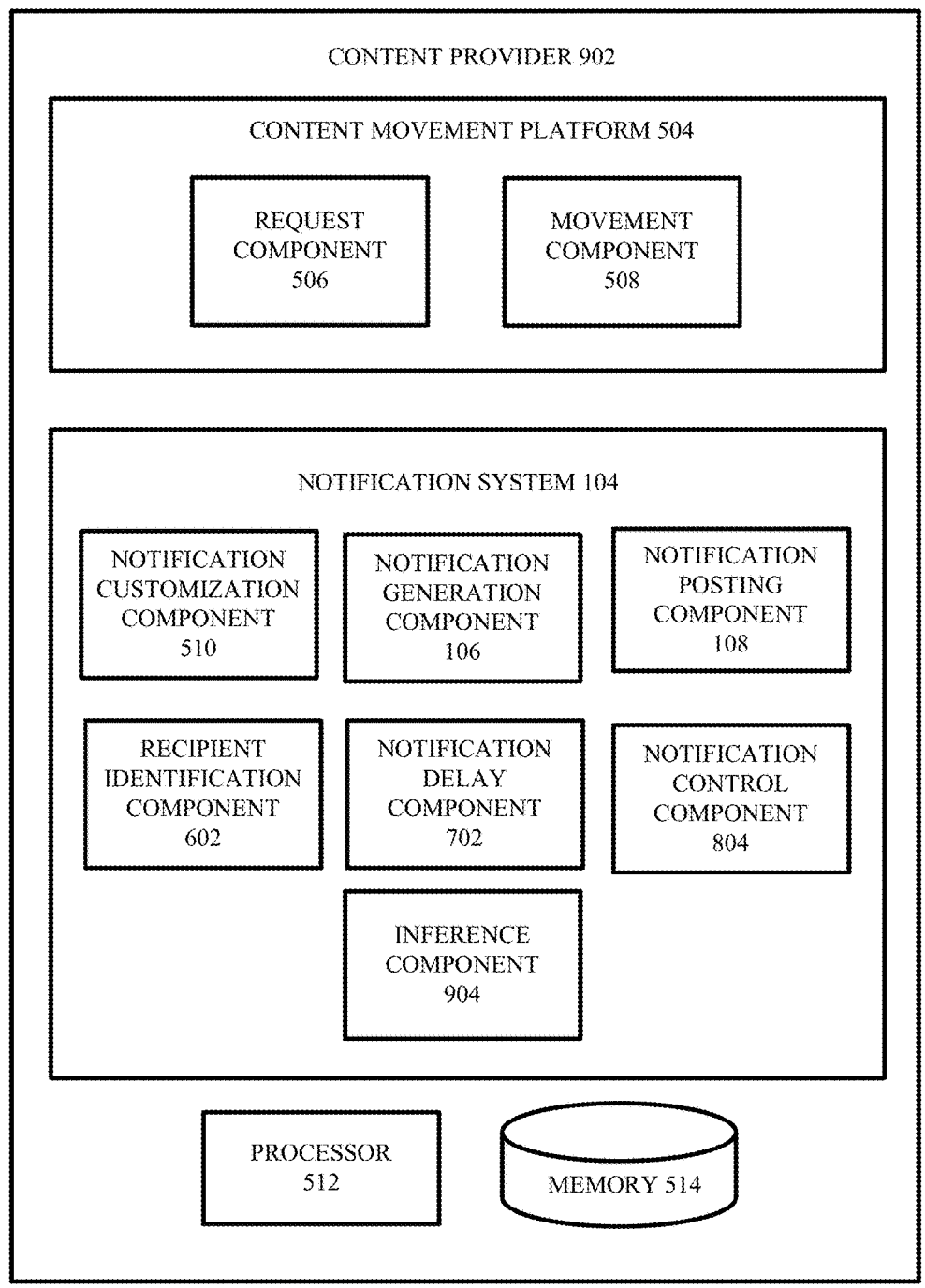
FIG. 9 presents another example content provider employing a notification system to notifying a user regarding movement of a content item, provided by the content provider, which the user has previously expressed interest in, to a new content source, in accordance with various aspects and embodiments described herein.

FIG. 9 illustrates another example content provider 902 employing notification system 104 to facilitate notifying a user regarding movement of a content item which the user has previously expressed interest in, to a new content source/location in accordance with various aspects and embodiments described herein. Content provider 902 can include same or similar features and functionalities of as content providers previously described. Repetitive description of like elements employed in respective embodiments of systems and interfaces described herein are omitted for sake of brevity.

Content provider 902 is similar to content provider 802 with the addition of inference component 904 to notification system 104. Inference component 904 is configured to provide for or aid in various inferences or determinations associated with aspects of notification system 104. In aspect, all or portions of content provider 902 can be operatively coupled to inference component 904. Moreover, inference component 904 can be granted access to all or portions of remote content sources, external information sources and client devices.

In order to provide for or aid in the numerous inferences described herein, inference component 904 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 10:
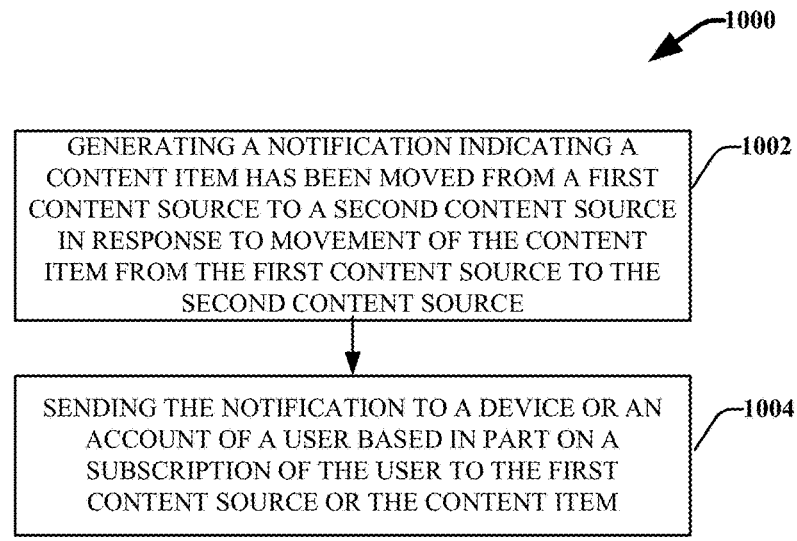
FIG. 10 is a flow diagram of an example method for notifying a user regarding movement of a content item, which the user has previously expressed interest in, to a new content source, in accordance with various aspects and embodiments described herein.
Figure 11:
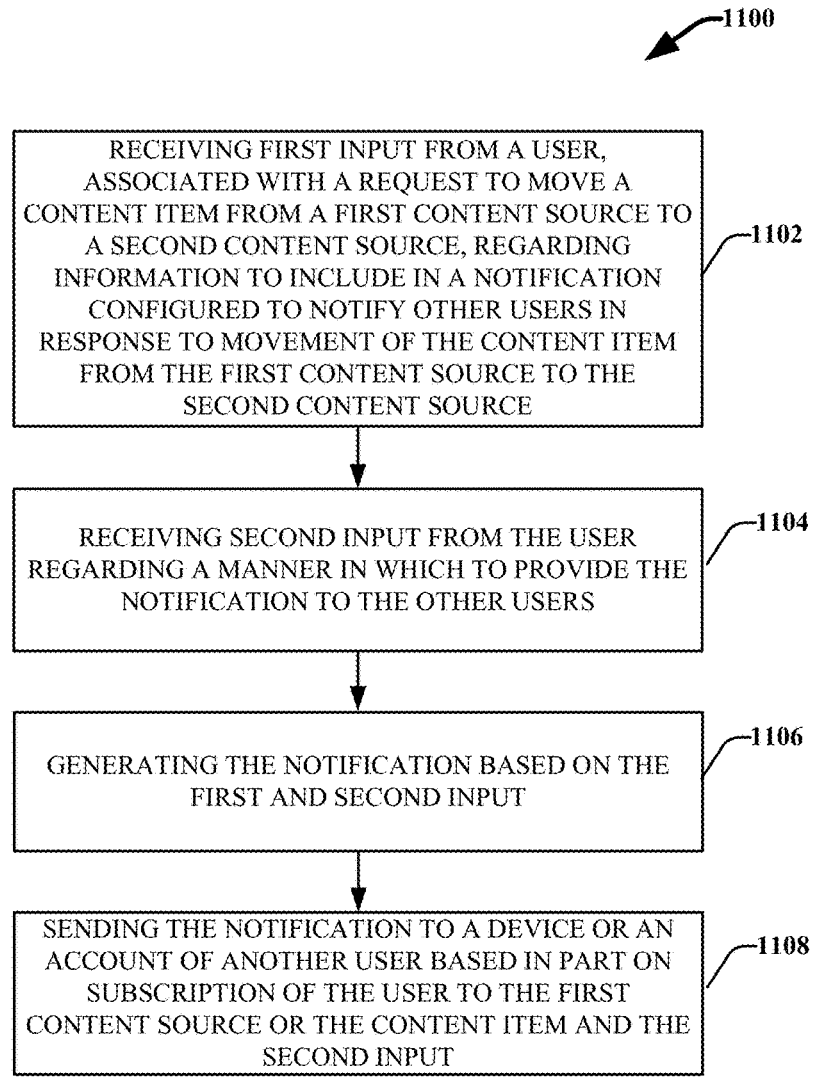
FIG. 11 is a flow diagram of another example method for notifying a user regarding movement of a content item, which the user has previously expressed interest in, to a new content source, in accordance with various aspects and embodiments described herein.
Figure 12:
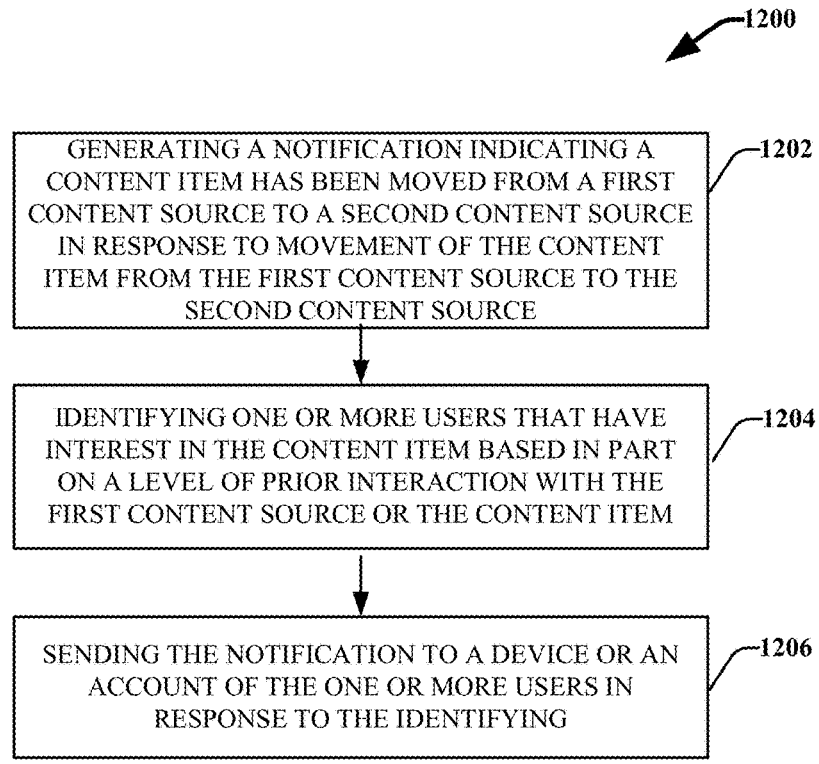
FIG. 12 is a flow diagram of another example method for notifying a user regarding movement of a content item, which the user has previously expressed interest in, to a new content source, in accordance with various aspects and embodiments described herein.

In view of the example systems and/or devices described herein, example methods that can be implemented in accordance with the disclosed subject matter can be further appreciated with reference to flowcharts in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow chart of an example method 1000 for notifying a user regarding movement of a content item which the user has previously expressed interest in, to a new content source in accordance with aspects described herein. At 1002, a notification is generated, indicating a content item has been moved from a first content source to a second content source, in response to movement of the content item from the first content source to the second content source. At 1004, the notification is sent to a device or an account of a user based in part on a subscription of the user to the first content source or the content item.

FIG. 11 illustrates a flow chart of another example method 1100 for notifying a user regarding movement of a content item which the user has previously expressed interest in, to a new content source in accordance with aspects described herein. At 1102, first input is received from a user associated with a request to move a content item from a first content source to a second content source, regarding information to include in a notification configured to notify other users in response to movement of the content item from the first content source to the second content source. At 1104, second input is received from the user regarding a manner in which to provide the notification to the other users. At 1106, the notification is generated based on the first and second input. At 1108, the notification is send to a device or an account of another user based in part on subscription of the other user to the first content source or the content item and the second input.

FIG. 12 illustrates a flow chart of another example method 1200 for notifying a user regarding movement of a content item which the user has previously expressed interest in, to a new content source in accordance with aspects described herein. At 1202, a notification is generated, indicating a content item has been moved from a first content source to a second content source, in response to movement of the content item from the first content source to the second content source. At 1204, one or more users that have interest in the content item are identified based in part on a level of prior interaction with the first content source or the content item. At 1204, the notification is sent to a device or an account of the one or more users based on the identification.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 13:
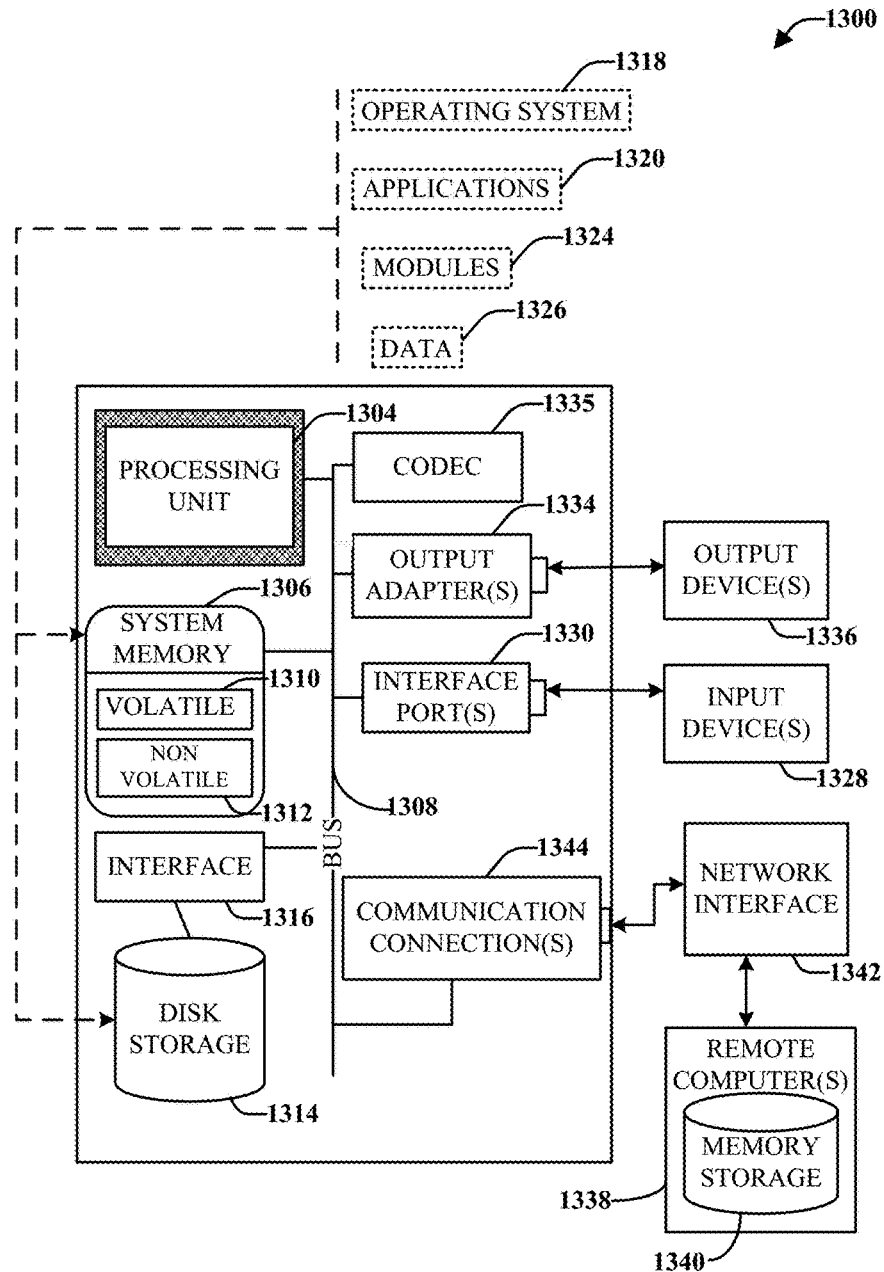
FIG. 13 is a schematic block diagram illustrating a suitable operating environment in accordance with various aspects and embodiments.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available suitable processors. Dual microprocessors and other multiprocessor architectures also can be employed as the processing unit 1304.

The system bus 1308 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13134), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1305 may include at least one of an encoder or decoder, wherein the at least one of an encoder or decoder may consist of hardware, a combination of hardware and software, or software. Although, codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1302 may also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s). Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
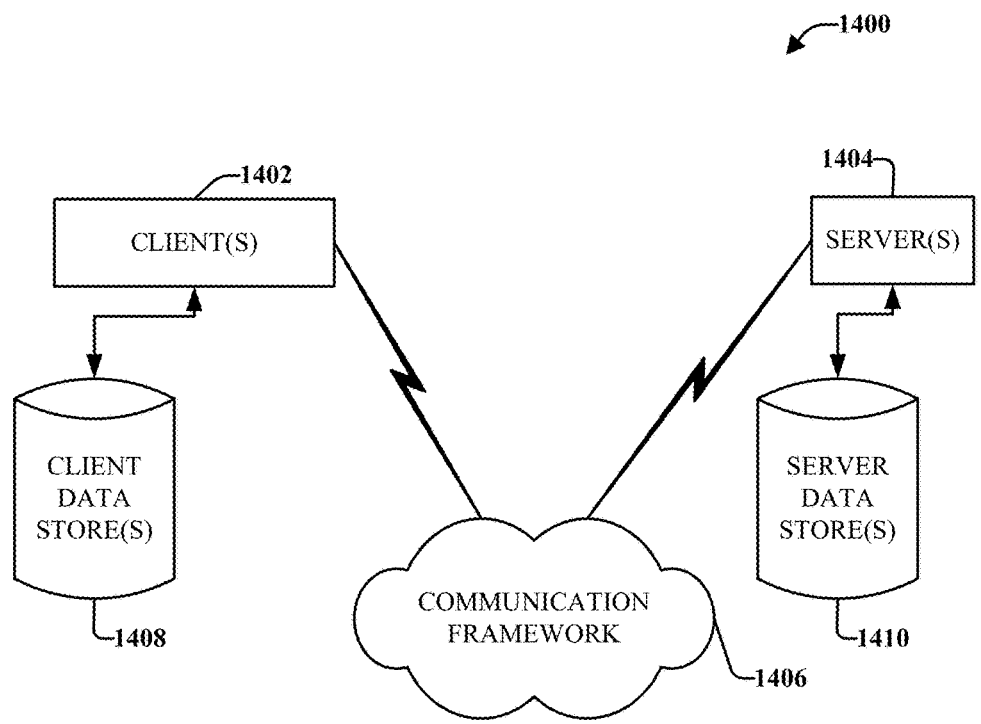
FIG. 14 is a schematic block diagram of a sample-computing environment in accordance with various aspects and embodiments.

Referring now to FIG. 14, there is illustrated a schematic block diagram of a computing environment 1400 in accordance with this disclosure. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a metadata, e.g., associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 include or are operatively connected to one or more client data store(s) 1408 that can be employed to store information local to the client(s) 1402 (e.g., associated contextual information). Similarly, the server(s) 1404 are operatively include or are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A system, comprising:
    a memory that stores computer executable components; and
    a processor that is programmed to:
        identify a content item associated with a first collection of content items associated with a first content source that has been moved to a second collection of content items associated with a second content source in response to a request from the first content source to move the content item to the second content source, wherein the first collection of content items and the second collection of content items are associated with a video providing service;
        identify a user account of a plurality of user accounts subscribed to the first collection of content items;

determine a that a notification to indicate the content item has been moved from the first collection of content items to the second collection of content items is to be configured as a feed item presented on a user device based on preferences specified by the first content source and based on a date associated with publication of the content item;

determine information to be included in a notification based on the preferences specified by the first content source;

generate a user interface that indicates a plurality of content items associated with a plurality of collections of content items, wherein the plurality of collections of content items includes the first collection of content items, and wherein the user interface includes the notification of the determined type;

determine a context of a user of the user account, wherein the context of the user indicates whether the user is unlikely to acknowledge the notification, and wherein the context of the user is based on whether the user is actively employing the user account to which the feed item is to be presented;

delay presentation of the user interface on the user device until the user is actively employing the user account to which the feed item is to be presented; and cause the user interface that includes the notification to be presented on the user device.

2. The system of claim 1, wherein the type of notification is a feed item and the processor is further programmed to send the notification to an information feed associated with the account.

3. The system of claim 2, wherein the user account is a social networking account hosted by another system.

4. The system of claim 1, wherein the processor is further programmed to include the notification in an electronic message and wherein the processor is further programmed to send the electronic message to an electronic messaging account of the user.

5. The system of claim 1, wherein the processor is further programmed to receive a request initiated by another user, to move the content item from the first collection of content items to the second collection of content items.

6. The system of claim 5, wherein the processor is further programmed to receive input from the other user regarding information to include in the notification.

7. The system of claim 6, wherein the processor is further programmed to generate one or more notification items to include in the notification based on a type of action requested to effectuate the movement of the content from the first collection of content items to the second collection of content items, wherein the input comprises a selection of one of the notification items.

8. The system of claim 7, wherein the notification items include at least one of, a notification of copy of the content item from the first collection of content items to the second network location, a notification of transfer of the content item from the first network location to the second network location, or a notification of upload of the content item from the first collection of content items to the second collection of content items.

9. The system of claim 6, wherein the processor is further programmed to generate the one or more notification items based on a determination that a second version of the content item has been published at the first collection of content items.

10. The system of claim 1, wherein the processor is further programmed to generate the notification comprising a time stamp associated with a time of the movement of the content item from the first collection of content items to the second collection of content items.

11. The system of claim 1, wherein the processor is further programmed to determine information included in the notification based on a type of the movement of the content item from the first network location to the second collection of content items, wherein the type of movement can include copying of the content item from the first collection of content items to the second collection of content items, transfer of the content item from the first collection of content items to the second collection of content items, or upload of the content item from the first collection of content items to the second collection of content items.

12. The system of claim 1, wherein the processor is further programmed to send the notification to the device or the account of the user based on one or more prior interactions of the user with the content item.

13. The system of claim 1, wherein the processor is further programmed to send the notification to the device or the account of the user based on a likelihood that the user will receive and acknowledge the notification.

14. A method comprising:

using a processor to execute the following computer executable instructions stored in a memory to perform the following acts:

identifying a content item associated with a first collection of content items associated with a first content source that has been moved to a second collection of content items associated with a second content source in response to a request from the first content source to move the content item to the second content source, wherein the first collection of content items and the second collection of content items are associated with a video providing service;

identifying a user account of a plurality of user accounts subscribed to the first collection of content items;

determining a that a notification to indicate the content item has been moved from the first collection of content items to the second collection of content items is to be configured as a feed item presented on a user device based on preferences specified by the first content source and based on a date associated with publication of the content item;

determining information to be included in a notification based on the preferences specified by the first content source;

generating a user interface that indicates a plurality of content items associated with a plurality of collections of content items, wherein the plurality of collections of content items includes the first collection of content items, and wherein the user interface includes the notification of the determined type;

determining a context of a user of the user account, wherein the context of the user indicates whether the user is unlikely to acknowledge the notification, and wherein the context of the user is based on whether the user is actively employing the user account to which the feed item is to be presented;

delaying presentation of the user interface on the user device until the user is actively employing the user account to which the feed item is to be presented; and causing the user interface that includes the notification to be presented on the user device.

15. The method of claim 14, wherein the notification type is a feed item.

16. The method of claim 14, further comprising:
receiving input from a user associated with a request to move the content item from the first collection of content items to the second collection of content items regarding information to include in the notification; and
including the information in the notification.

17. The method of claim 14, further comprising:
receiving input from a user associated with a request to move the content item from the first collection of content items to the second collection of content items regarding a manner in which to provide the notification to user; and
sending the notification to the device or the account of the user based in part on the input.

18. The method of claim 14, further comprising:
determining information included in the notification based on a type of action that effectuates the movement of the content from the first collection of content items to the second collection of content items.

19. The method of claim 14, further comprising sending the notification to the device or the account of a user based in part on one or more prior interactions of the user with the content item.

20. A non-transitory computer-readable storage medium comprising computer-readable instructions that, in response to execution, cause a computing system to perform operations, comprising:
identifying a content item associated with a first collection of content items associated with a first content source that has been moved to a second collection of content items associated with a second content source in response to a request from the first content source to move the content item to the second content source, wherein the first collection of content items and the second collection of content items are associated with a video providing service;
identifying a user account of a plurality of user accounts subscribed to the first collection of content items;
determining a that a notification to indicate the content item has been moved from the first collection of content items to the second collection of content items is to be configured as a feed item presented on a user device based on preferences specified by the first content source and based on a date associated with publication of the content item;
determining information to be included in a notification based on the preferences specified by the first content source;
generating a user interface that indicates a plurality of content items associated with a plurality of collections of content items, wherein the plurality of collections of content items includes the first collection of content items, and wherein the user interface includes the notification of the determined type;
determining a context of a user of the user account, wherein the context of the user indicates whether the user is unlikely to acknowledge the notification, and wherein the context of the user is based on whether the user is actively employing the user account to which the feed item is to be presented;
delaying presentation of the user interface on the user device until the user is actively employing the user account to which the feed item is to be presented; and
causing the user interface that includes the notification to be presented on the user device.

* * * * *